United States Patent [19]
Clugston

[11] 3,961,809
[45] June 8, 1976

[54] SAFETY STEP FOR VEHICLES

[76] Inventor: George Doyle Clugston, Rural Rte. 3, Pittsburg, Kans. 66762

[22] Filed: Feb. 6, 1975

[21] Appl. No.: 547,382

[52] U.S. Cl. .............................. 280/166; 105/447; 182/91; 182/96; 296/62
[51] Int. Cl.² ......................................... B60W 3/02
[58] Field of Search ............ 280/163, 164 R, 164 A, 280/166; 105/443, 447, 448; 182/91, 95, 96; 296/62

[56] References Cited
UNITED STATES PATENTS

| | | | |
|---|---|---|---|
| 2,575,615 | 11/1951 | Crump............................ | 280/166 X |
| 3,853,369 | 12/1974 | Holden .......................... | 280/166 X |
| 3,865,399 | 2/1975 | Way.................................. | 280/166 |
| 3,889,997 | 6/1975 | Schoneck......................... | 182/91 X |

*Primary Examiner*—M. H. Wood, Jr.
*Assistant Examiner*—Michael J. Forman
*Attorney, Agent, or Firm*—Schmidt, Johnson, Hovey & Williams

[57] ABSTRACT

A tailgate-mounted safety step assembly for pickup trucks and the like is provided which includes a linkage assembly coupled with a step for permitting shifting of the latter between a storage position and a lowered horizontal use position, in conjunction with a selectively engageable clutch lock operable to securely lock the step in the use position thereof when a person mounts the step, while allowing the lowered step to shift fore-and-aft when not in use in order to accommodate any road obstructions which may be encountered. By virtue of the unique clutch lock employed, the step assembly hereof may be utilized without fear of instability or unsteadiness notwithstanding the fact that the lowered step is movable when struck by an obstruction in order to preclude damage to the overall assembly. In preferred forms, the assembly includes parallelogram linkage having a split shaft clutch lock secured to the step and telescoped over a transverse, axially rotatable pivot member of the linkage assembly, such that when a person mounts the step the clutch lock grippingly engages the pivot member to releasable hold the latter and thereby temporarily rigidify the entire step assembly to permit safe use thereof.

8 Claims, 9 Drawing Figures

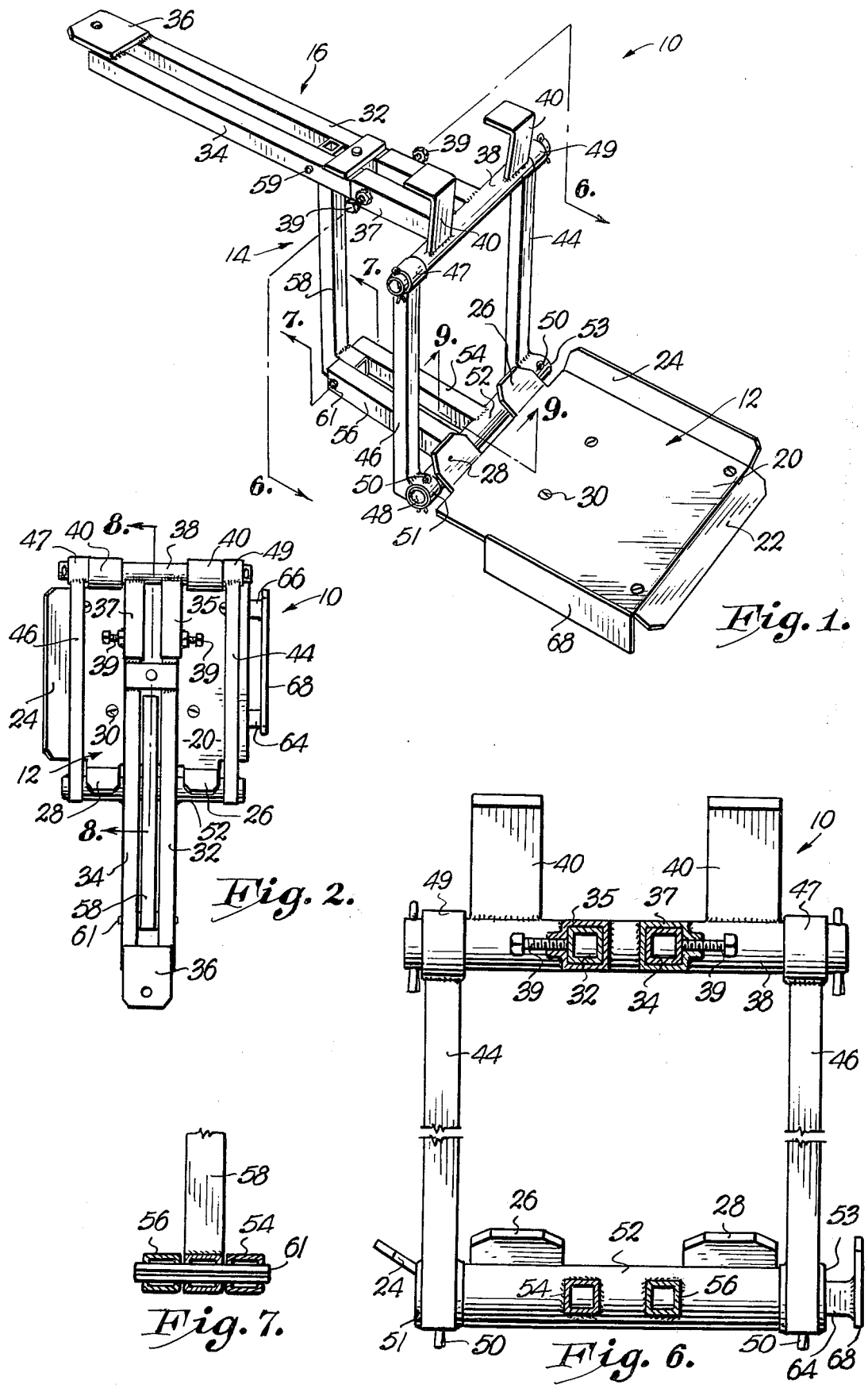

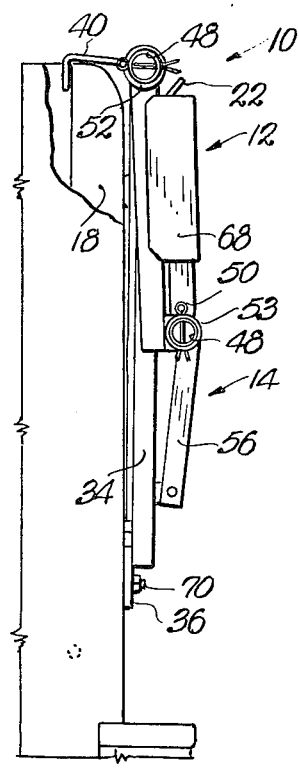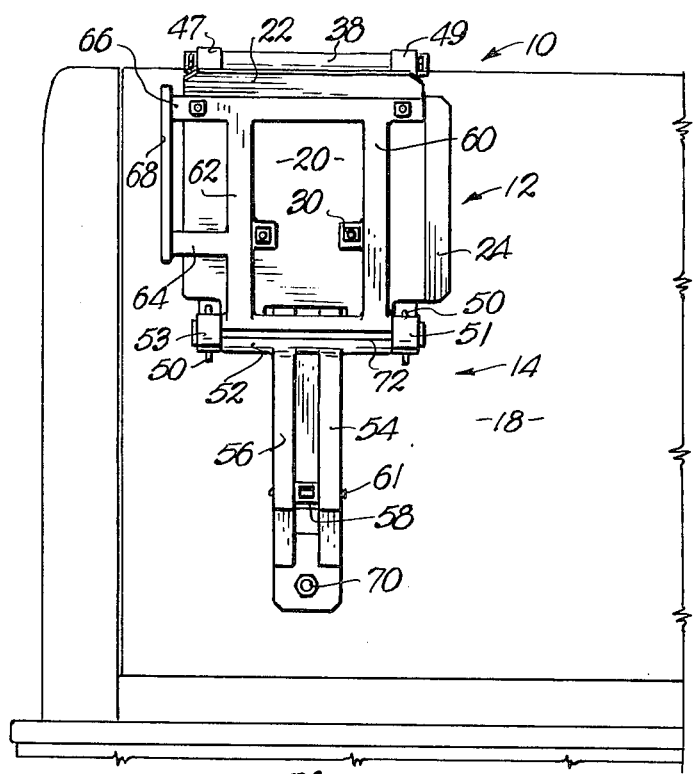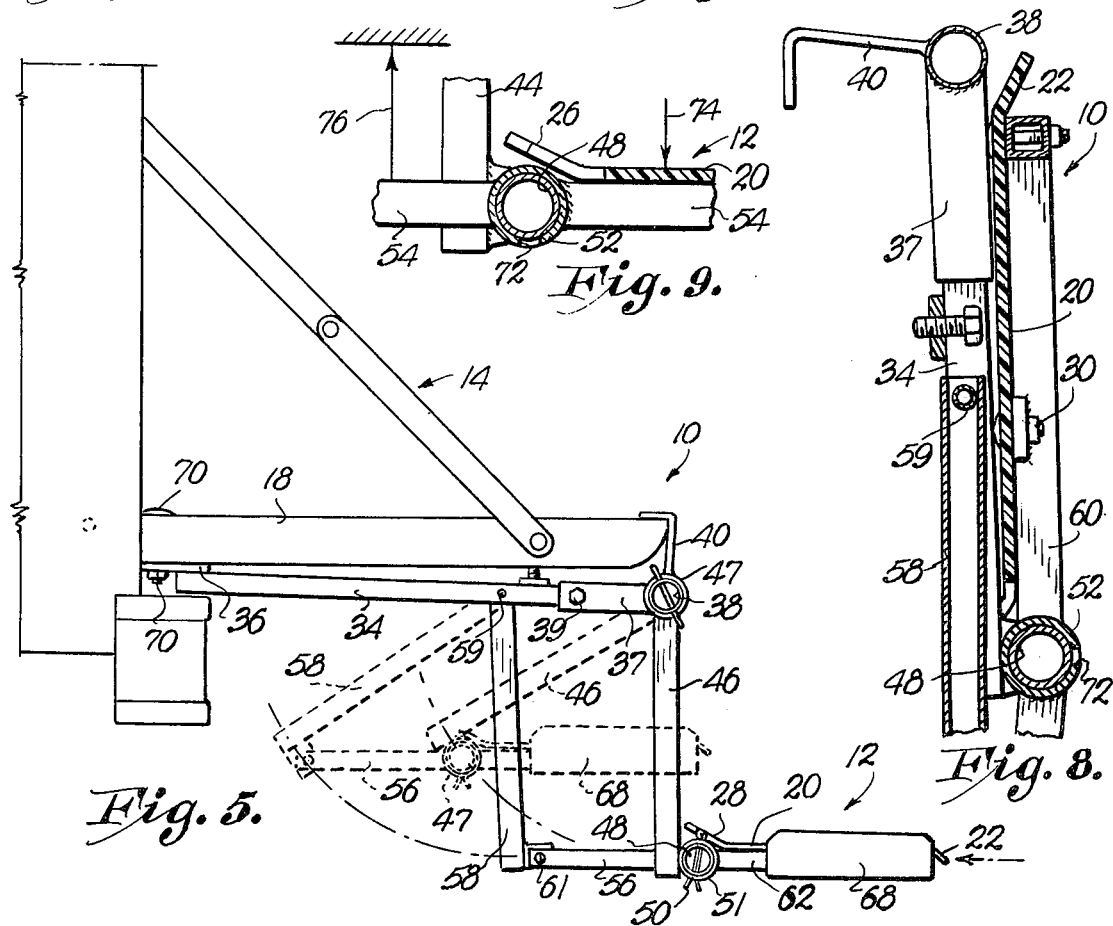
Fig. 3. Fig. 4. Fig. 9. Fig. 5. Fig. 8.

SAFETY STEP FOR VEHICLES

This invention relates to safety step assemblies for use with trucks and especially in conjunction with a hingedly mounted tailgate on a pickup truck or the like. More particularly, it is concerned with such safety step assemblies which utilize selectively operable mechanism for securely locking the step in the lowered, use position thereof when a person mounts the step while allowing the lowered step to move freely when not in use.

Safety step assemblies have been provided for a number of years for use with pickup trucks or other vehicles. These assemblies generally include a step having linkage structure coupled thereto for permitting the step to be shifted from a recessed storage position to a lowered, generally horizontal use position. In such constructions the step is normally manually moved to the use position thereof whereupon the step can be mounted to facilitate entry and work about the truck bed. In other cases, similar safety step assemblies have been utilized with pickup-mounted campers in order to facilitate entrance into the camper section by providing a step between ground level and the camper body itself.

In practice, prior safety step constructions have proven to be deficient in a number of respects. Most importantly, some of these units do not provide adequate rigid support for the step when lowered to its operative disposition, which as a consequence makes use thereof extremely unsafe, and can lead to a serious injury to the user from falls or the like. In an attempt to overcome this problem many prior units utilize relatively heavy linkage assemblies and support structures for insuring stability of the step during use thereof, but this of course increases the cost and complexity of these units and moreover creates a number of other difficulties. For example, such heavy and cumbersome linkage structure oftentimes necessitates first manually lowering the step into position and thereafter rigidly locking the same by a separate operation prior to each use of the step, which as can be appreciated is a troublesome and time-consuming task.

Finally, when conventional safety step constructions are lowered and locked in their horizontal use positions they are generally rigid and therefore subject to damage when struck by a road obstruction or the like. Thus, if one of these units is lowered and the vehicle backed into a wall or other obstruction, the entire safety step can be damaged or completely destroyed by virtue of the rigid nature thereof. On the other hand, during forward travel with the step lowered, rocks or other road debris can strike the step and likewise severely damage the same.

It is therefore the most important object of the present invention to provide a safety step assembly for vehicles which includes as an adjunct thereof mechanism for releasably locking the step in the horizontal use or work position thereof when a person mounts the step, while allowing relatively unrestrained movement of the lowered step when the latter is not in use so as to accommodate any road obstructions without untoward damage to the assembly.

Another object of the invention is to provide a safety step assembly especially adapted for mounting on the tailgate of a pickup truck or the like and having parallelogram linkage operable to automatically shift the step between a vertical, folded storage position and a horizontal work position upon opening and closing of the tailgate, in conjunction with a split shaft clutch lock coupled with the step and operable to releasably grip the linkage assembly when a person mounts the step in order to stabilize and rigidify the entire assembly during mounting thereof, notwithstanding the fact that the lowered step is free to move fore and aft when not in use.

In the drawings:

FIG. 1 is a perspective view of a safety step assembly in accordance with the invention shown with the step thereof in its lower, horizontal use position;

FIG. 2 is an elevational view of the step assembly depicted in FIG. 1, shown in its folded, retracted position;

FIG. 3 is a side elevational view of a step assembly as illustrated in FIGS. 1 and 2, shown mounted on a pickup truck tailgate and in the retracted storage position thereof;

FIG. 4 is a front elevational view of the mounted safety step assembly depicted in FIG. 3;

FIG. 5 is a side elevational view of the mounted safety step assembly shown in FIGS. 3 and 4 but with the truck tailgate lowered and the step shifted to its lower horizontal use position;

FIG. 6 is a vertical sectional view taken along line 6—6 of FIG. 1;

FIG. 7 is a fragmentary, vertical sectional view taken along line 7—7 of FIG. 1;

FIG. 8 is a fragmentary vertical sectional view taken along line 8—8 of FIG. 2; and FIG. 9 is a fragmentary, vertical sectional view taken along line 9—9 of FIG. 1 and illustrating the split shaft clutch lock feature of the present invention.

A safety step assembly 10 is shown in FIG. 1 and broadly includes a step 12, parallelogram linkage assembly 14, and tailgate mounting structure 16. Assembly 10 is especially adapted to be secured to a hingedly mounted tailgate 18 of a pickup truck or the like, as illustrated in FIGS. 3–5, and in this connection step 12 is automatically shiftable upon opening and closing of tailgate 18 between the vertically recessed storage position shown in FIG. 3, and the lowered, generally horizontal use position depicted in FIG. 5.

Step 12 is an integral member preferably formed of synthetic resin material which includes a generally planar foot panel 20 having a downwardly inclined front lip 22, and an upwardly inclined side section 24. In addition, step 12 has a pair of spaced, upwardly and rearwardly extending tab portions 26 and 28. A series of four bolt and nut assemblies 30 extend through foot panel 20 and affix step 12 to underlying metallic support structure later to be described.

Tailgate mounting structure 16 includes a pair of elongate, spaced, tubular bars 32 and 34 having an apertured mounting plate 36 in spanning relationship thereto at the normal lowermost ends of the bars. A pair of somewhat shorter, hollow, tubular members 35 and 37 telescopically receive the normal uppermost ends of bars 32 and 34, and for this purpose each of the tubular members 35 and 37 includes a setscrew 39 to secure the bars 32 and 34 in proper relative disposition. An elongate, transversely mounted pivot shaft 38 is fixedly secured to the normally uppermost ends of members 35 and 37 and includes a pair of normally rearwardly extending, generally L-shaped mounting brackets 40.

Parallelogram linkage assembly 14 includes first and second depending linkage arms 44 and 46 each having integral, tubular portions 47 and 49 which receive the respective ends of pivot shaft 38 in order to pivotally mount arms 44 and 46 on the latter. Similarly, the distal ends of arms 44 and 46 likewise include integral tubular portions 51 and 53 which receive the respective ends of an elongate, transversely extending, axially rotatable shaft 48. Arms 44 and 46 are secured to shaft 48 by means of cotter pins 50 extending through tubular portions 51 and 53 and shaft 48 so that relative rotation between the arms and shaft 48 is precluded.

A longitudinally split, generally tubular clutch shaft 52 is telescoped over shaft 48 between the respective linkage arms 44 and 46. Clutch shaft 52 includes a longitudinal gap 72 along the entire length thereof and has a pair of elongate, spaced, tubular linkage arms 54 and 56 fixedly secured thereto and extending rearwardly therefrom as depicted in FIG. 1. Finally, a depending linkage arm 58 equal in length to arms 44 and 46 is pivotally secured at the uppermost end thereof between bars 32 and 34 by means of pivot pin 59, and at the lowermost end thereof between arms 54 and 56 by means of pivot pin 61.

A pair of spaced connection arms 60 and 62 are also securely affixed to clutch shaft 52 and extend upwardly therefrom as viewed in FIG. 4 for the purpose of supporting step 12. In this regard, four bolt and nut assemblies 30 extend through foot panel 20 of step 12 and are connected to the respective connection arms 60 and 62. In addition, connection arm 62 includes a pair of spaced, laterally extending extensions 64 and 66 which support an upright, planar footscraper 68 at the outermost ends thereof which extends a short distance above the level of foot panel 20.

As illustrated in FIGS. 3–5, assembly 10 can be mounted on tailgate 18 simply by hooking the L-shaped mounting brackets 40 over the uppermost edge of the tailgate, whereupon a bolt 70 can be inserted through the tailgate and the aperture of mounting plate 36 in order to securely affix the step assembly to the tailgate. Such mounting permits assembly 10 to remain in a folded, generally vertical storage position depicted in FIG. 3 with the parallelogram linkage assembly thereof nested against tailgate 18 when the latter is in its raised position.

When it is desired to utilize the assembly, it is only necessary to open tailgate 18 whereupon step 12 is moved to its lower, generally horizontal use position under the influence of gravity. In this orientation (see FIG. 5) the step 12 and linkage assembly 14 remain essentially free to move in a fore-and-aft manner as illustrated in phantom. For example, should tailgate 18 be lowered and the truck accidentally backed into a wall or other obstruction, assembly 10 will be moved by engagement with the obstruction into a safely recessed position in order to preclude untoward damage or destruction thereof. Moreover, even if the vehicle is driven forwardly and assembly 10 is struck by a rock or other road debris, the linkage assembly acts to prevent undesirable damage. In this instance, the assembly is moved to the right as viewed in FIG. 5 in order to accomodate the clear any such obstruction. When this has been accomplished, the assembly resumes its original lowered disposition under the influence of gravity and is ready for its intended purpose.

Thus, the user can operate the vehicle in any normal manner with the step assembly 10 in its lowered, operative disposition without fear of any significant damage thereto. As can be appreciated, when a person is desirous of mounting step 12 for facilitating entry into the truck bed, it is necessary that the described for-and-aft movement of assembly 10 be positively precluded. This is accomplished by the gripping action of clutch shaft 52 about shaft 48 induced by the downwardly directed force of a person's weight on step 12, which has the affect of temporarily rigidifying the entire step assembly during such use.

To elaborate, shaft 52 is configured with gap 72 to permit free pivotal movement of shaft 48 therewithin when step 12 is not in use, and this as a consequence allows linkage assembly 14 and step 12 coupled thereto to move in the described fore-and-aft manner in the lowered position thereof, as well as to move between the storage and use positions thereof during opening and closing of tailgate 18. However, when a person mounts step 12 by stepping onto foot panel 20 thereof, the following occurs. First, a torque-like force is applied through connecting arms 60 and 62 coupled to shaft 52, which has the effect of compressing the latter about axially rotatable shaft 48. This causes a secure gripping action of the rotatable shaft 48 and thereby precludes further movement of step 12 and linkage assembly 14. In addition, the downwardly directed torque-like force through connection arms 60 and 62 (illustrated by arrow 74) induces a reaction force illustrated by arrow 76 which is directed upwardly through linkage arm 58 coupled with arms 54 and 56. Thus, when a person mounts step 12 the entire assembly 10 is immediately stabilized and movement thereof is essentially precluded. Further, when the user demounts step 12, clutch shaft 52 assumes its original disposition permitting free axial rotation of shaft 48, whereupon step 12 and linkage assembly 14 can shift fore-and-aft as described, and move under the influence of gravity upon the opening and closing of tailgate 18.

Thus, it will be seen that the present invention provides a safety step assembly for vehicles such as pickup trucks and the like which is selectively lockable in the horizontal work position thereof only when needed, i.e., when a person mounts the step, and which remains essentially free to shift when the step is not in use in order to accomodate and avoid damage from road obstructions or the like. In addition, the parallelogram linkage assembly employed is operable to shift the step to the optimum work position solely under the influence of gravity without the need for any manual attention whatsoever.

Having thus described the invention, what is claimed as new and desired to secure by Letters Patent is:

1. Safety step apparatus for vehicles comprising:
   a step;
   means coupled with said step for positioning the latter in a generally horizontal use position,
   said coupled means comprising a linkage assembly operable to permit movement of said step between a storage position and said use position thereof;
   means for locking said step in said use position thereof when a downwardly directed force is applied thereto, and for permitting movement of said step when said downwardly directed force is relieved,
   said locking means comprising structure for gripping said linkage assembly and holding the same against movement when said downwardly directed force is applied to said step, and for releasing said linkage assembly when said downwardly directed force is relieved, said structure comprising a longitudinally split shaft telescoped over an axially rotatable pivot member forming a part of said linkage assembly, said step being secured to said split shaft and extending outwardly of said linkage assembly, said split shaft being operable to grip said pivot member when said downwardly directed force is applied to said step and to release said pivot member when said force is relieved; and means for securing said apparatus to a vehicle.

2. Safety step apparatus for vehicles comprising:

a pair of normally upright, side linkage arms;

means for pivotally mounting said side linkage arms upon a vehicle for swinging movement thereof about respective, horizontally offset, parallel axes adjacent the upper extremities thereof;

a lower linkage arm pivotally interconnected with one of said side linkage arms for relative swinging movement therebetween about an axis normally below and parallel to said first-mentioned parallel axes;

a pivot member carried by the other of said side linkage arms and having an axis normally below and parallel to said first-mentioned parallel axes;

a resilient split shaft supported upon said pivot member, having a pair of opposed side portions, and having one side portion thereof secured to the extremity of said lower linkage arm remote from said one side linkage arm; and step means secured to the other side portion of said split shaft and extending from the latter in a direction away from said lower linkage arm, said split shaft and said pivot member normally being relatively rotatable, whereby said lower linkage arm and said other side linkage arm are normally free for relative swinging movement therebetween and said linkage arms and said step means are normally free to swing as a unit into a stowage position or away from an obstruction engaged by said step means to prevent damage to the apparatus, said split shaft being deformable under the influence of the weight of a user upon said step means to clamp said split shaft about said pivot member for automatically releasably locking said linkage arms and step means in a use position whenever a user places his weight onto said step means.

3. Safety step apparatus including:

a parallel linkage assembly having an upper linkage arm, a lower linkage arm, a pair of side linkage arms, and four pivotal connecting means having parallel axes for swingably interconnecting, respectively, said upper arm adjacent one extremity thereof with one of said side arms adjacent the upper extremity thereof, said one side arm adjacent the lower extremity thereof with said lower arm adjacent one extremity thereof, said lower arm adjacent the other extremity thereof with the other of said side arms adjacent the lower extremity thereof, and said other side arm adjacent the upper extremity thereof with said upper arm adjacent the other extremity thereof;

releasable means mounted on said assembly and operably associated with one of said connecting means for preventing relative swinging movement between the arms interconnected by said one connecting means when said releasable means ia actuated; and step means supported by said assembly and operably coupled with said releasable means for actuating the latter in response to the weight of a user when placed upon said step means.

4. The invention of claim 3, wherein said step means normally extends outwardly from said assembly in a direction away from said one connecting means opposite said lower arm.

5. The invention of claim 4, wherein said one connecting means includes a pivot member, and said releasable means includes a resilient split shaft supported on said shaft means for normal relative pivoting movement therebetween.

6. The invention of claim 5, wherein said split shaft is split along the lower portion thereof presenting a pair of opposed side portions of the element normally spaced from each other at their lower extremities, and said lower arm and said step means are respectively secured to said opposed side portions of said split shaft, whereby a downward force exerted upon said step means will deform said split shaft to bring the latter into clamping relationship with said pivot member.

7. The invention of claim 6, wherein is provided means for securing said upper arm of said assembly to the tailgate of a truck, and, when said tailgate is lowered to its opened generally horizontal condition, said side arms of said assembly will automatically swing under the influence of gravity into an unfolded condition depending from said tailgate and disposing said step means in its use position.

8. The invention of claim 7, wherein, when said tailgate is raised to its closed upright condition, said normally lower and side arms of said assembly will automatically swing under the influence of gravity into a stowage position disposing said assembly and step means in folded condition closely adjacent said tailgate.

* * * * *